(12) United States Patent
Lennen

(10) Patent No.: US 6,239,743 B1
(45) Date of Patent: May 29, 2001

(54) INTEGRATED SPLIT SPECTRUM POSITIONING SYSTEM RECEIVER

(75) Inventor: Gary R. Lennen, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/362,393

(22) Filed: Jul. 28, 1999

(51) Int. Cl.[7] .............................. H04J 27/30; H04B 7/185
(52) U.S. Cl. ...................................... 342/357.12; 375/150
(58) Field of Search ....................... 342/357.12; 375/150, 375/147, 130

(56) References Cited

U.S. PATENT DOCUMENTS

| | | | |
|---|---|---|---|
| 5,228,055 | * | 7/1993 | Uchida et al. .................. 375/142 |
| 5,781,152 | * | 7/1998 | Renard et al. .................. 342/357.12 |
| 6,058,135 | * | 5/2000 | Spilker, Jr. ..................... 375/130 |

OTHER PUBLICATIONS

McDonald, Keith D., "The GPS Modernization Dilemma and Some Topics For Resolution", ION Newsletter, vol. 8, No. 2, Summer 1998.*

* cited by examiner

*Primary Examiner*—Gregory C. Issing
(74) *Attorney, Agent, or Firm*—Cooper & Dunham LLP; William E. Pelton; Donald S. Dowden

(57) ABSTRACT

A receiver for tracking sources of position system signals transmitted as split spectrum signals is disclosed. The receiver provides a digital tracker to track a portion of the split spectrum signal. Each digital tracker may have an independent tracking loop solely for tracking a respective portion of the split spectrum signal. Such an arrangement provides anti-jamming benefits. Alternatively, the tracking loops may be dependent by providing information ascertained by one digital tracker to another digital tracker, thereby to provide an increased signal-to-noise ratio.

7 Claims, 14 Drawing Sheets

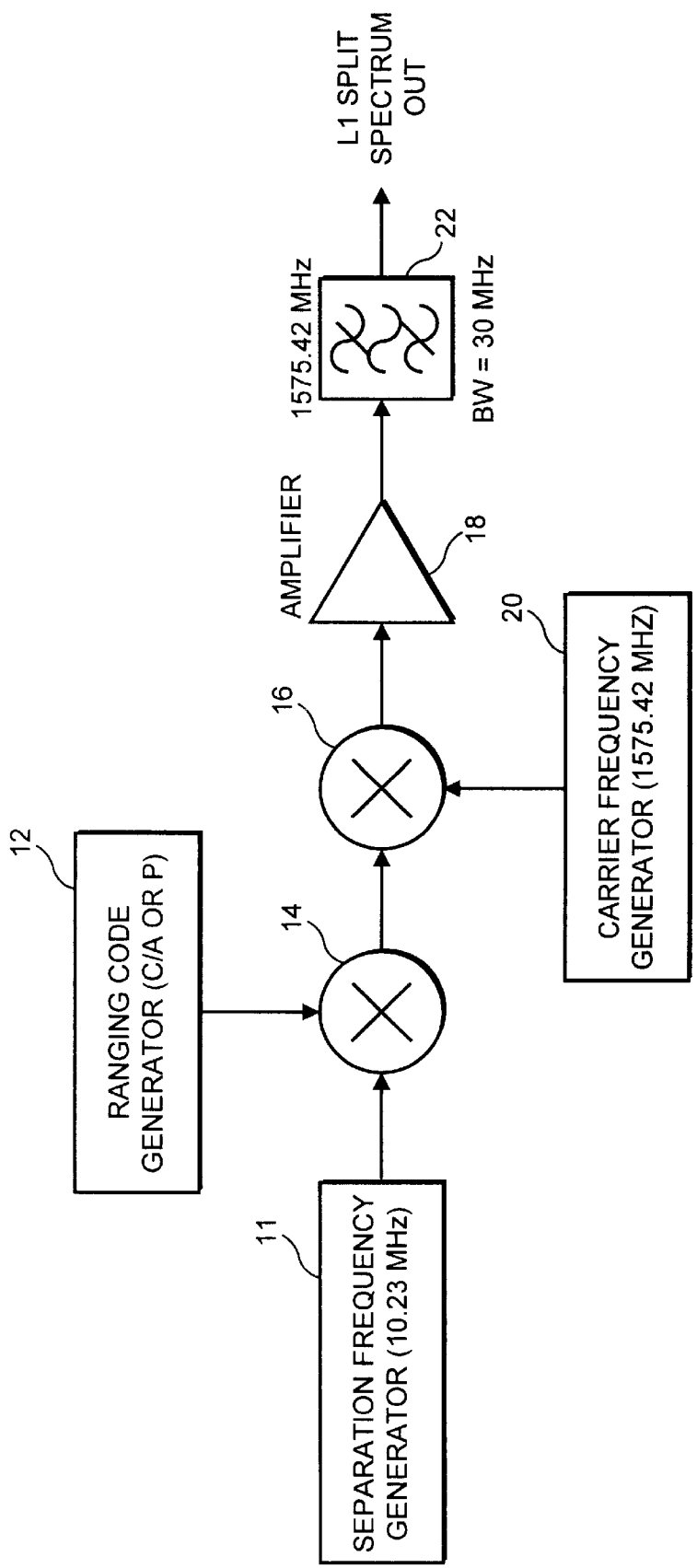
F I G. 1

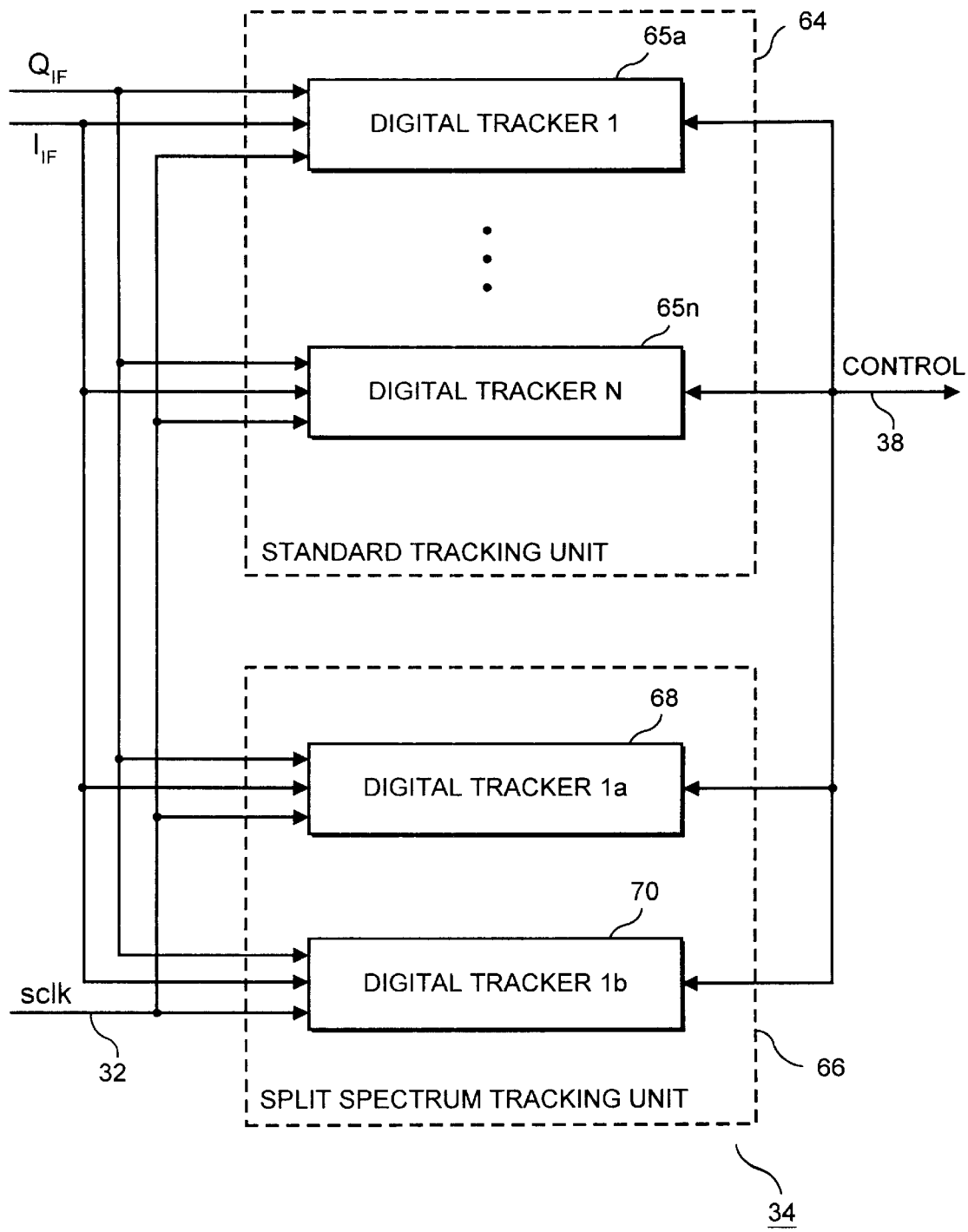
F I G. 5

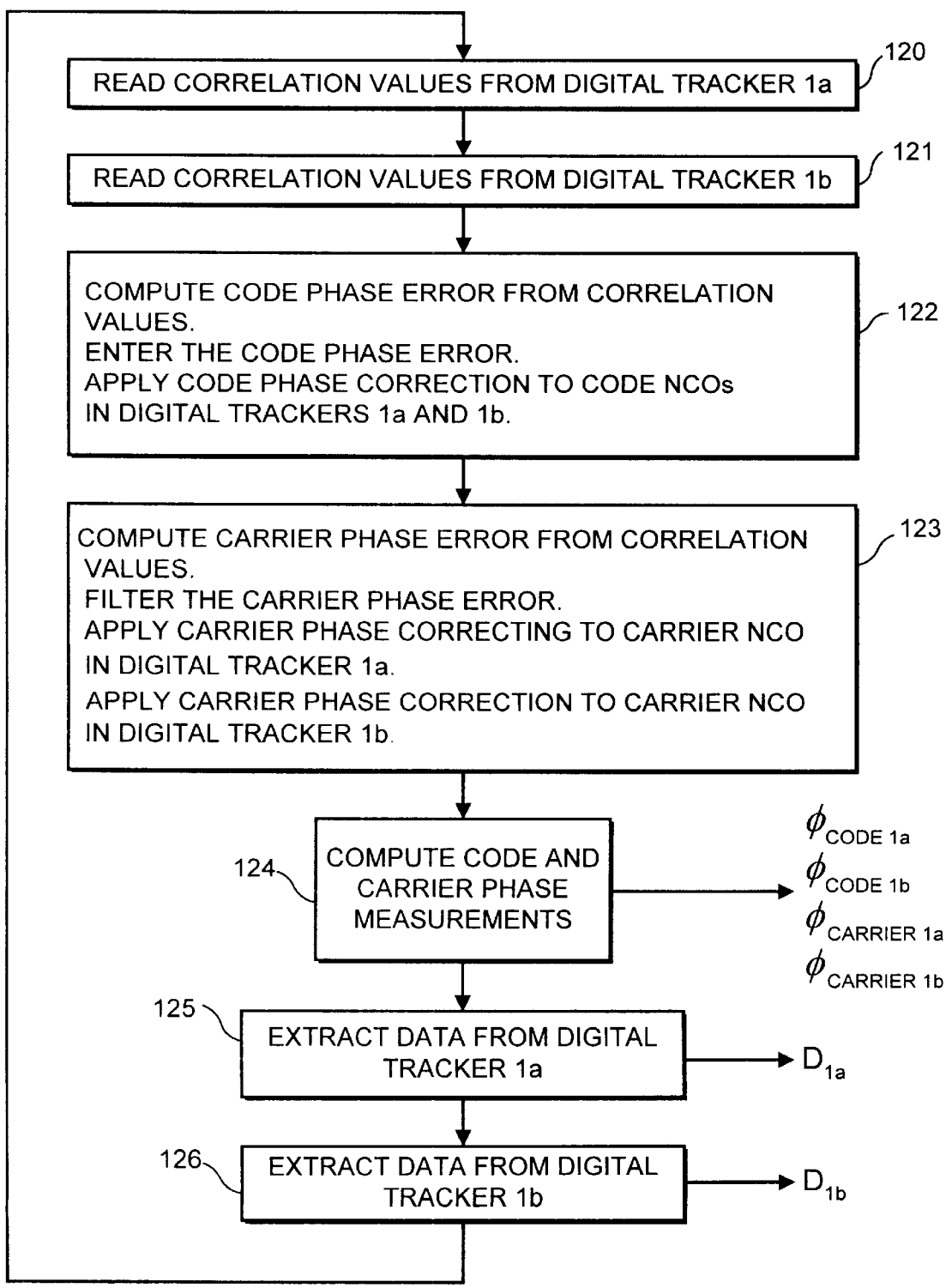
F I G. 8

INTEGRATED SPLIT SPECTRUM POSITIONING SYSTEM RECEIVER

FIELD OF THE INVENTION

This invention relates to receivers for processing information containing signals and, in particular, to positioning system receivers such as global positioning system ("GPS") receivers which may be adapted to receive and process split spectrum positioning system signals and/or standard (non-split) spectrum GPS navigation signals.

BACKGROUND OF THE INVENTION

GPS is a navigation and position service offering worldwide, 24 hour coverage. GPS includes satellites to broadcast GPS satellite signals, stations to monitor and control the satellites, and receivers. GPS receivers demodulate the satellite signals to calculate a range for each satellite from which signals are being received ("in view"), and from that range compute the location of the receiver.

GPS satellites broadcast two codes. Each of these codes, as part of the standard GPS signal structure, contain and are modulated with information from which the location of the receiver can be derived. The two codes are: (1) Precision or Protected code ("P code"); and (2) Coarse Acquisition code ("C/A code"). Although P code can be encrypted by an additional code to prevent unauthorized use, C/A code is freely available.

Each GPS satellite broadcasts on two frequency bands ("carrier bands"), one centered on 1575.42 megahertz, the "L1" frequency band, and the other centered on 1227.6 megahertz, the "L2" frequency band. Each frequency band includes the P code, but only the L1 band includes the C/A code. Each GPS satellite is assigned a unique C/A code and a unique P code. The unique codes enable a GPS receiver to distinguish the GPS signals being received from each other.

To enhance system performance, the standard GPS signal structure can be augmented with split spectrum modulation. The power distribution of a split spectrum modulated signal is substantially different from that of a standard spectrum signal. That is, the power distribution of the standard GPS signal largely surrounds the L1 carrier center frequency, whereas the power distribution of a split spectrum signal is concentrated away from and on opposite sides of the center frequency. This separation of power distribution concentrations may be used advantageously to improve jamming performance, and is described in connection with at least one of the embodiments of the invention described below. Split spectrum modulation can be added to transmissions from satellites or ground-based sources ("pseudolites") in the same frequency band used by the standard GPS signal structure.

BRIEF SUMMARY OF THE INVENTION

The invention provides a method and apparatus for receiving and processing information containing signals, particularly navigation signals such as GPS signals as to which the receiver is adapted to perform signal tracking, code and carrier phase measurements, and data demodulation. In one embodiment, the invention provides a method of or apparatus for tracking a positioning signal from a positioning signal source where the positioning signal energy contains positioning information and is split within its frequency band so as to be concentrated about at least first and second frequencies within the frequency band. The method includes the step of correlating a first signal derived from energy concentrated about the first frequency with a first tracking signal to generate a first correlation signal. The method also includes the step of correlating a second signal derived from energy concentrated about the second frequency with a second tracking signal to generate a second correlation signal. The first tracking signal and the second tracking signal are adjusted respectively according to the first and second correlation signals so as to optimize energy representative of the positioning information for further processing by the receiver.

Other objects, advantages, and features of the invention will become apparent to those skilled in the relevant art upon consideration of the following description of the invention.

BRIEF DESCRIPTION OF THE DRAWINGS

For a further understanding of the present invention, reference may be had to the accompanying drawings, in which:

FIG. 1 is a block diagram of a split spectrum signal generator;

FIG. 5 is a block diagram illustrating a digital signal processor according to one embodiment of the invention;

FIG. 8 is a flowchart illustrating a procedure for dependent split spectrum tracking according to one embodiment of the invention;

BRIEF DESCRIPTION OF THE PREFERRED EMBODIMENTS

Figure 2A:
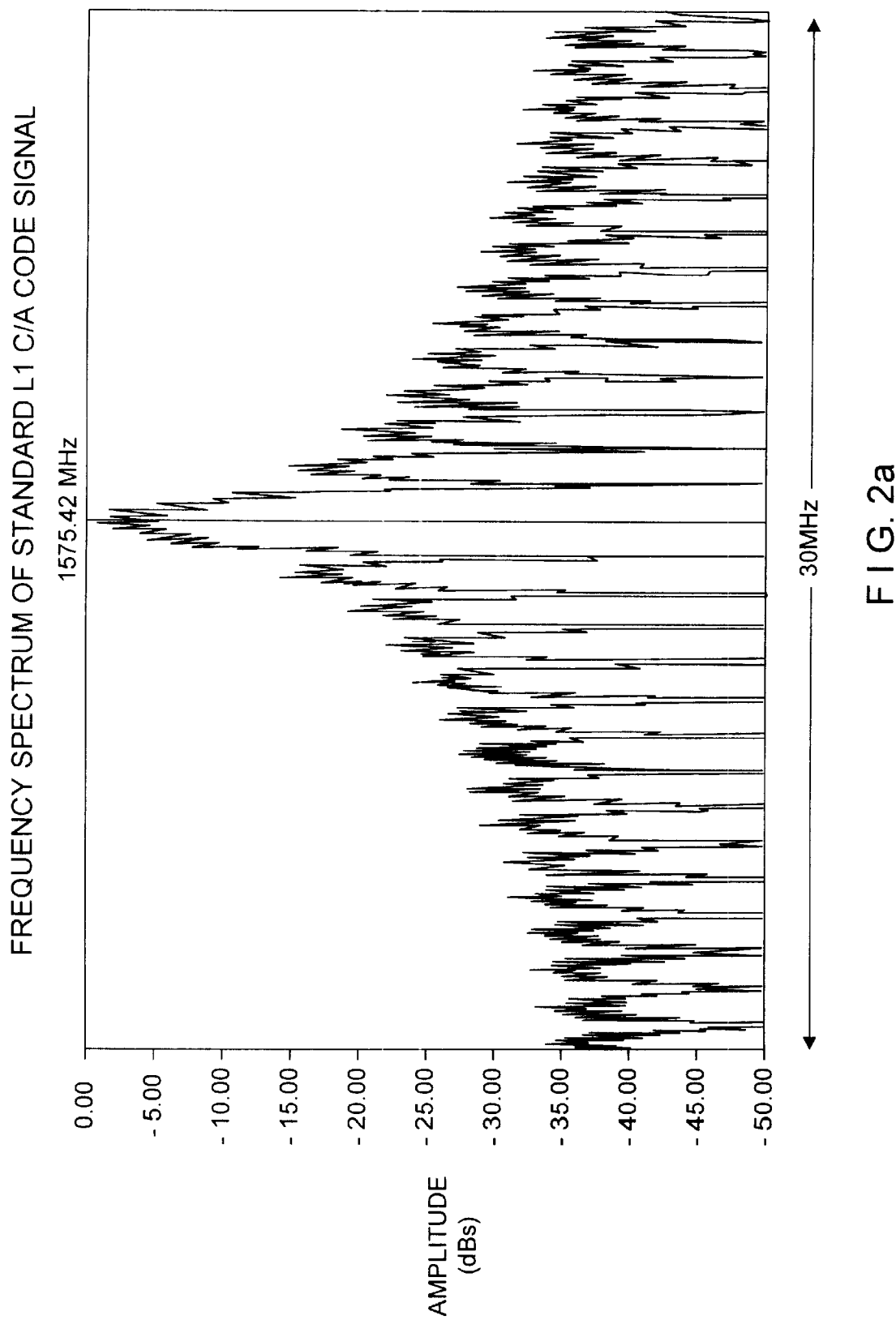
FIG. 2a illustrates a frequency spectrum of an L1 standard C/A code signal.

Referring now to the drawings, and in particular to FIG. 1, there is shown a block diagram of a signal generator 10 for generating a split spectrum signal in the L1 frequency band. Such a signal generator may be present in a GPS signal source such as an earth orbiting satellite or a ground based pseudolite. While the invention is described below with reference to the GPS L1 frequency band for both split spectrum and standard spectrum signals, it will be understood by those having ordinary skill in the relevant art that the invention is equally applicable to the L2 frequency band, as well as other carrier transmission frequencies.

As depicted in FIG. 1, the signal generator 10 consists of a code generator 12 for producing either the C/A code or the P code modulation signal. A separation frequency generator 11 produces a 10.23 megahertz signal which is applied as one input to a mixer 14. The nature and operation of the separation frequency generator 11 will be understood by those skilled in the relevant art. The other input to the mixer 14 is the output signal from the code generator 12. In the mixer 14 the code is modulated onto the signal output from the separation frequency generator with the result that the resulting modulated signal is a split spectrum signal. That is, the separation frequency produced by the separation frequency generator 11 determines the amount of separation between two 'sinc' ((sine x)/x) squared function peaks of the resulting split spectrum signal.

A mixer 16 receives the split spectrum signal output of the mixer 14 and the L1 carrier frequency generated by a carrier frequency generator 20. The split spectrum signal is thereby modulated onto the L1 carrier. The output of the mixer 16 is then amplified by an amplifier 18 and filtered by an appropriate filter 22 before the L1 split spectrum signal is transmitted.

Figure 2B:
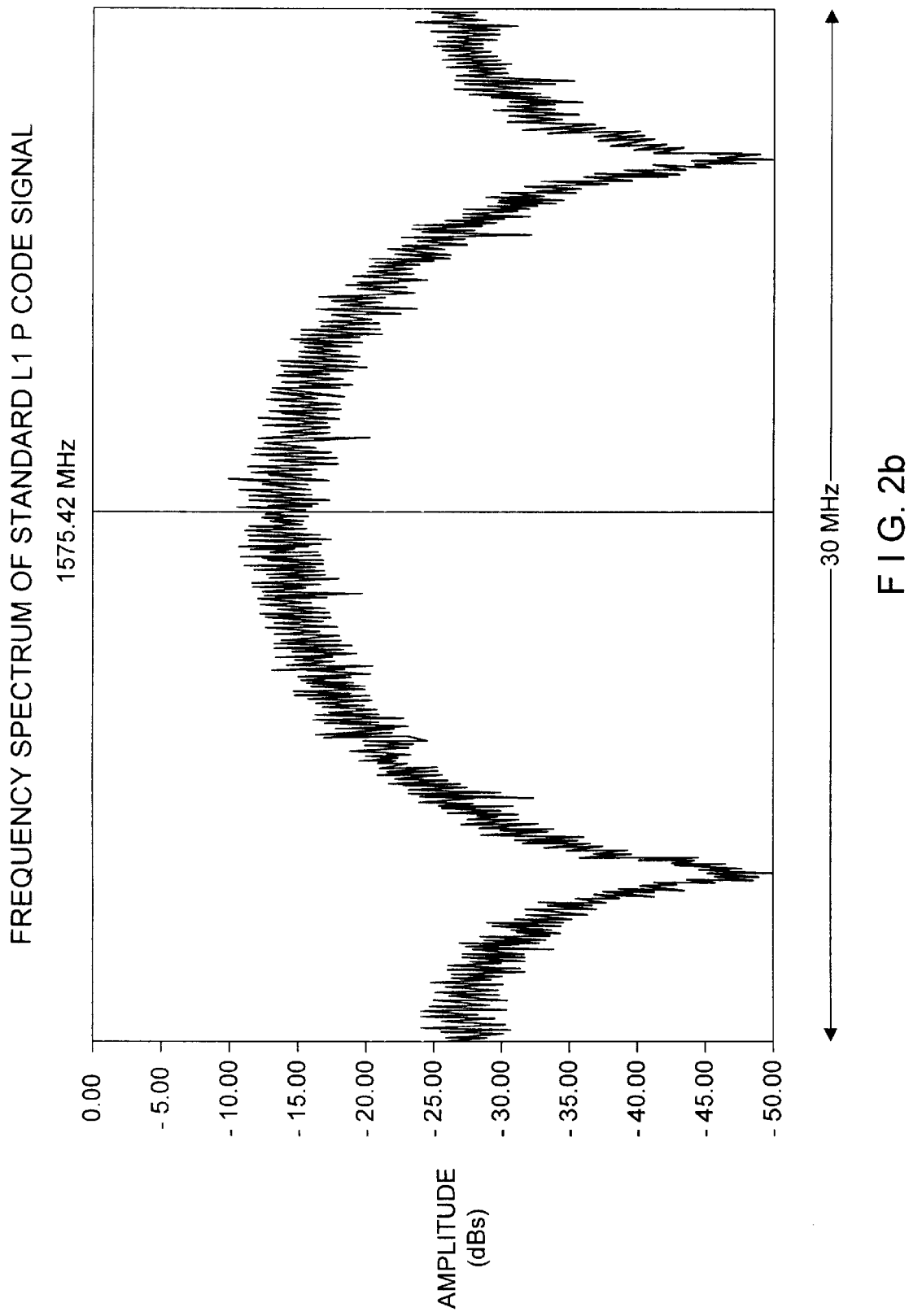
FIG. 2b illustrates a frequency spectrum of an L1 standard P code signal.

With reference now to FIG. 2a, there is illustrated the frequency spectrum of the L1 standard C/A code signal. Similarly, FIG. 2b illustrates the frequency spectrum of the L1 standard P code signal. Each of these frequency spectra has a single sinc squared power function peak centered on the L1 carrier frequency, although each lobe of the L1 standard P code signal has ten times the bandwidth of a lobe of the L1 standard C/A code signal. The 30 megahertz frequency bandwidth shown is the approximate bandwidth available to GPS transmissions.

Figure 2C:
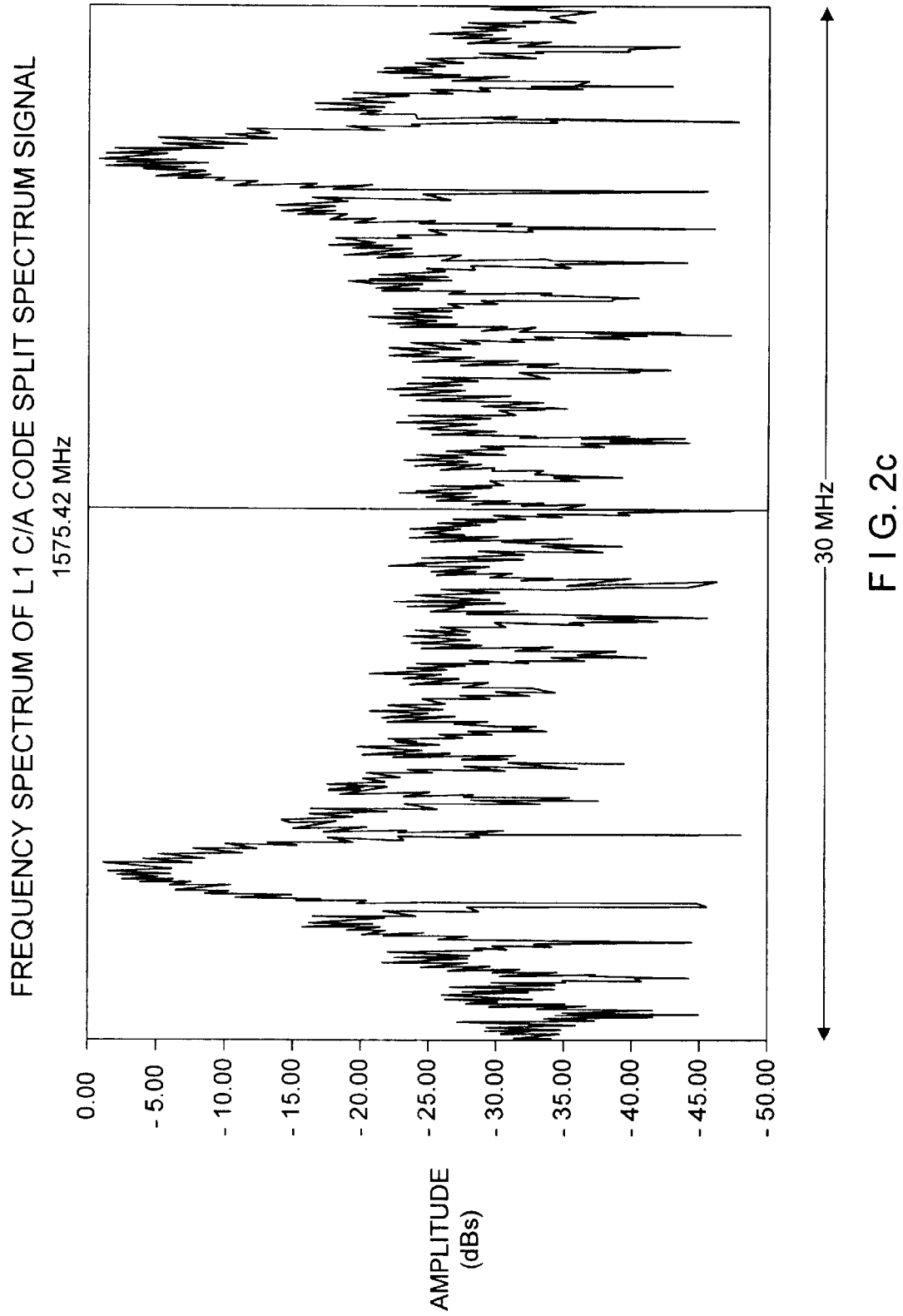
FIG. 2c illustrates a frequency spectrum of an L1 split spectrum C/A code signal.
Figure 2D:
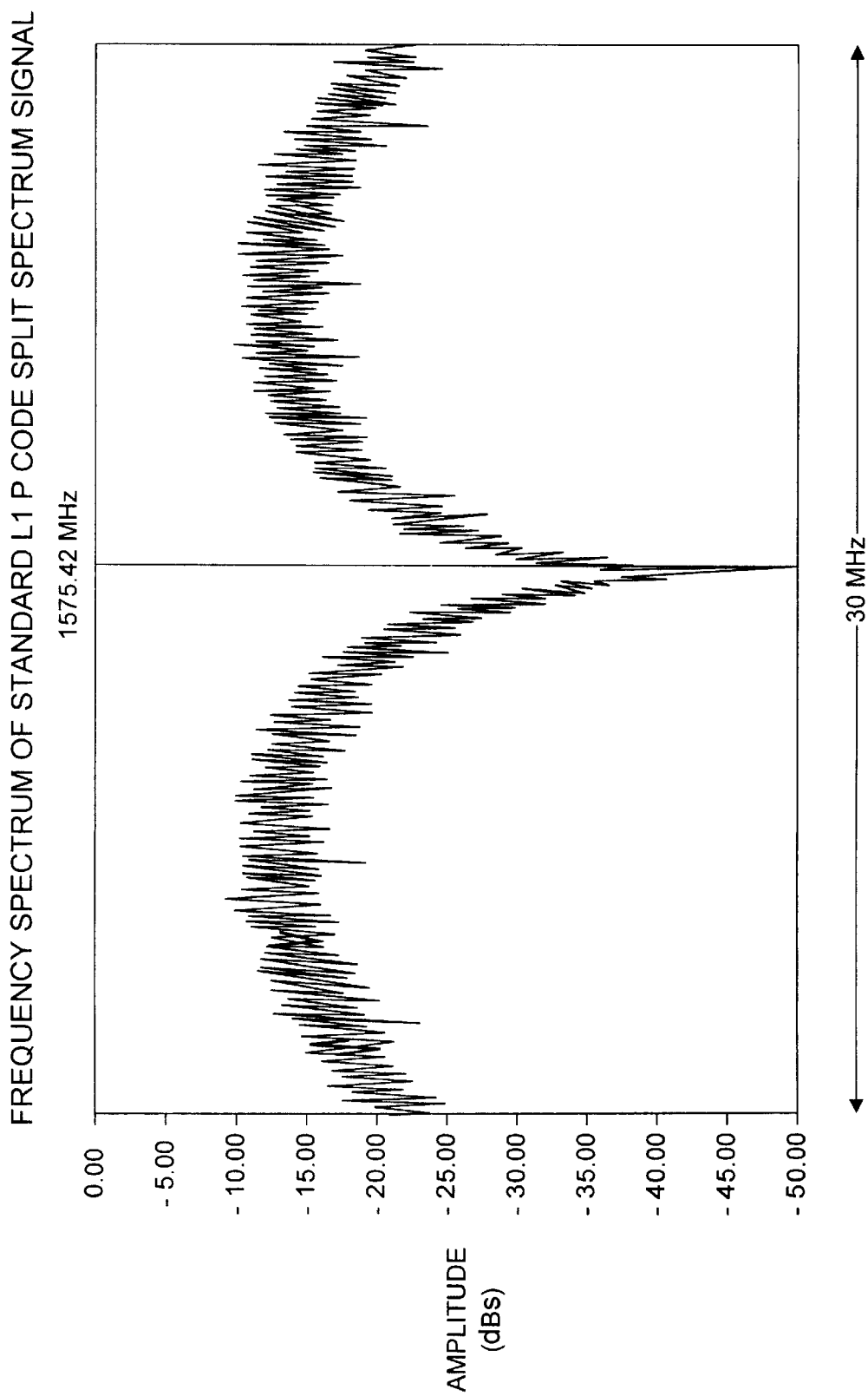
FIG. 2d illustrates a frequency spectrum of an L1 split spectrum P code signal.

FIGS. 2c and 2d illustrate the equivalent L1 C/A code and P code split spectrum signals, respectively, in the same 30 megahertz frequency bandwidth. In contrast to the frequency spectrum for standard GPS signals ("standard spectrum"), it is apparent from FIGS. 2c and 2d, that split spectrum modulation produces two sinc squared function peaks on either side of the center frequency of the relevant frequency band. In this illustration the relevant frequency band is the L1 band.

Figure 3:
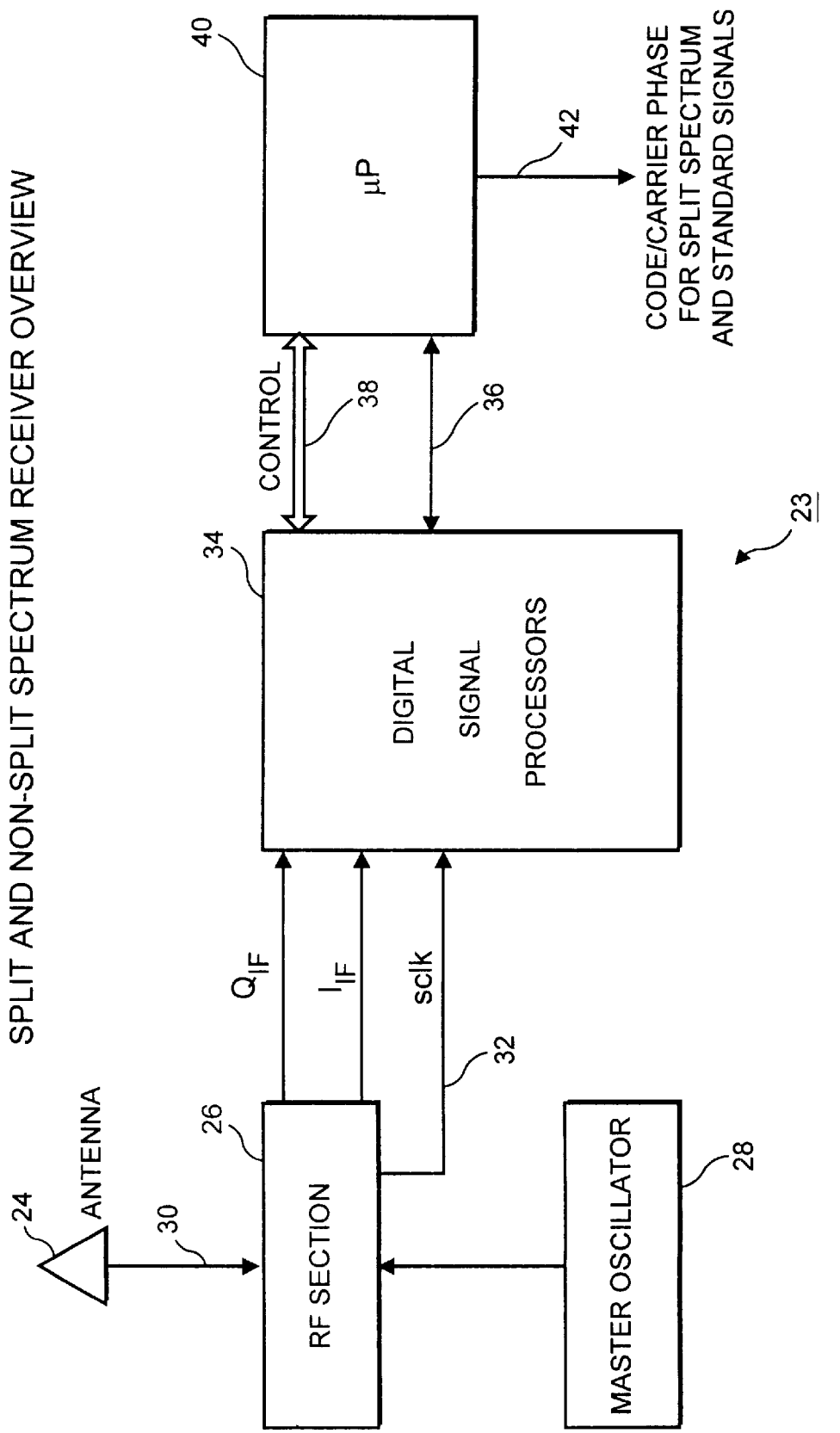
FIG. 3 is a block diagram of a receiver for receiving split spectrum and standard GPS signals according to one embodiment of the invention.

Referring now to FIG. 3, there is shown a high-level block diagram of a GPS receiver 23 according to one embodiment of the invention. An antenna 24 detects all the signals around the L1 carrier frequency within a bandwidth of approximately 30 megahertz ("L1 band") as a composite signal 30 which may contain both split spectrum signals and standard spectrum signals. An RF section 26 amplifies and frequency translates this composite signal 30 to an intermediate frequency ("IF"). The RF section 26 is driven by a master oscillator 28 so that all local oscillator and sampling frequencies used in the receiver 23 may be derived from the same clock source, as desired.

The output of the RF section 26 includes a sampling clock signal 32 and two sampled versions $I_{IF}$, $Q_{IF}$ of the composite signal 30. The sampling clock signal 32 and the sampled signals $I_{IF}$, $Q_{IF}$ are then further processed in a digital signal processor ("DSP") 34 controlled by a microprocessor 40. In this way, code and carrier signals of both the split spectrum and standard spectrum navigation signals can be tracked by the receiver 23. In this embodiment, the DSP 34 is adapted to track a number of split spectrum and standard spectrum signals at the same time, that is, in parallel.

The microprocessor 40 performs various control functions for the DSP including reading correlation values 36 output by the DSP 34 at regular intervals. The microprocessor 40 uses these correlation values 36 to complete code and carrier tracking loops, to extract data including ephemeris data, and to generate code and carrier phase measurements 42. The code and carrier phase measurements 42 from both split spectrum and standard spectrum signal tracking may be used, among other applications, to calculate the position of the receiver 23 and to set various clocks in the receiver 23. Normally, the applications that use the code and carrier phase measurements 42 can also be run on the microprocessor 40.

Figure 4:
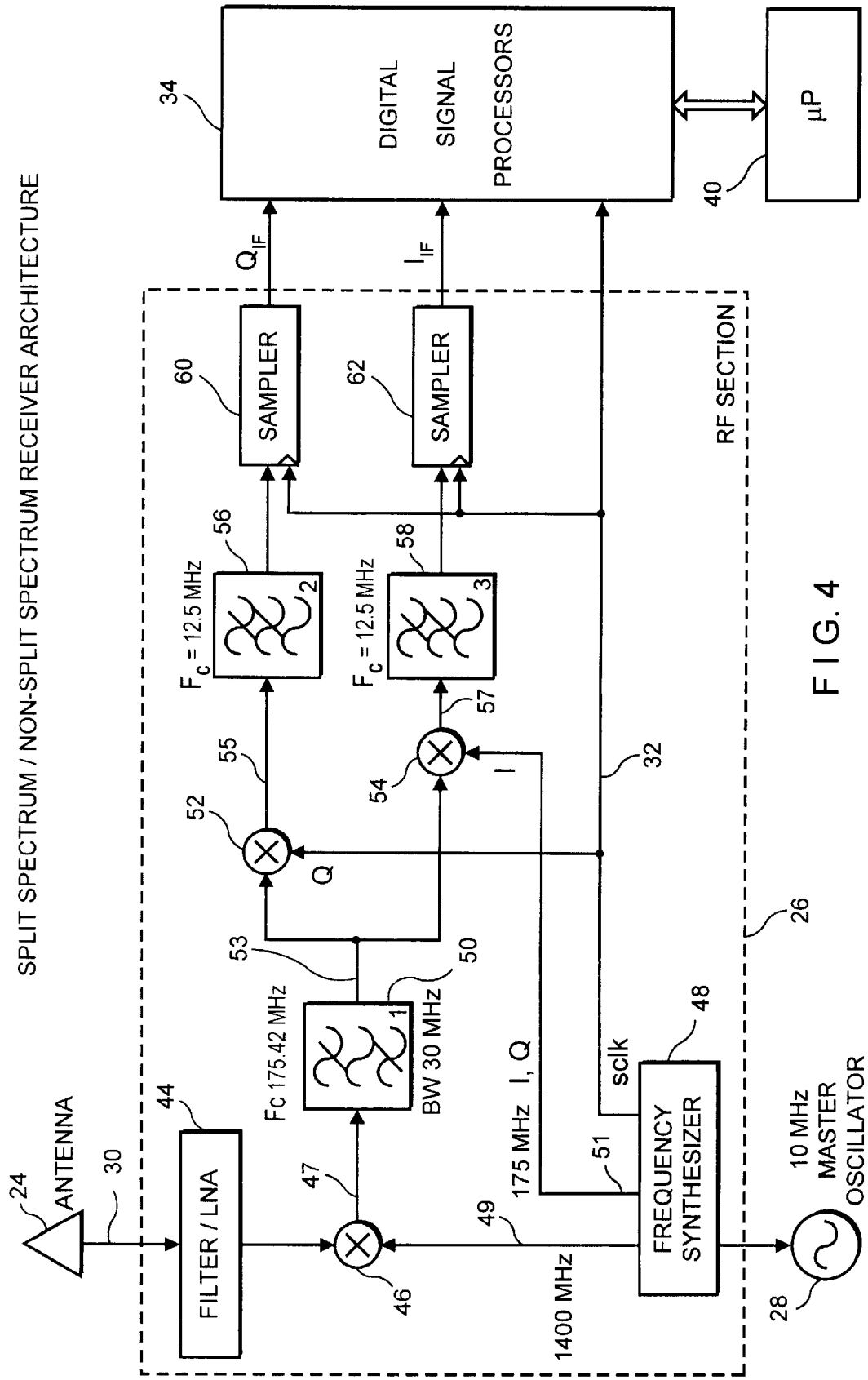
FIG. 4 is a block diagram illustrating a radio frequency ("RF") section according to one embodiment of the invention.

With reference to FIG. 4, there is shown detail of one possible embodiment of the RF section 26. The antenna 24 is coupled to a filter/low noise amplifier ("filter/LNA") 44. The filter/LNA 44 selectively strips from the composite signal 30 all but a desired signal bandwidth and provides low noise amplification to minimize receiver noise. A frequency synthesizer 48 converts an output of the master oscillator 28 into two local oscillator signals 49, 51 and the sampling clock signal 32. In this embodiment, the signal 49 has a frequency of 1400 meghertz and the signal 51 has a frequency of 175 megahertz. The sampling clock signal 32 may be used throughout the receiver, as desired.

The signal 49 is input to a mixer 46 which also receives the output from the filter/LNA 44. The mixer 46 thereby frequency translates the output signal of the filter/LNA 44. The output 47 from the mixer 46 is then passed through a filter 50 which typically has a surface acoustic wave ("SAW") design to maximize out-of-band rejection, that is, to eliminate those signals outside of the desired frequency band including undesired signals incidentally generated by the mixer 46. The filtered signal 53 is then further frequency translated by a mixer 54 along a first frequency path 57 and by a mixer 52 along a second frequency path 55 to generate in-phase ("I") and quadrature ("Q") signals, respectively. The I and Q signals generated by the mixers 54, 52 are passed through respective low pass filters 58, 56 and are then digitized in samplers 62, 60 respectively. Sampling in the samplers 62, 60 is driven by the sampling clock signal 32 to generate sampled signals $I_{IF}$, $Q_{IF}$ which are output to the DSP 34 along with the sampling clock signal 32. Additional amplifiers may be incorporated the RF section at each point in a frequency down conversion, as desired. While not shown in FIG. 4, the operation of such amplifiers is known in the art, see for example, U.S. Pat. No. 5,541,606, the subject matter of which is incorporated herein by reference.

With reference to FIG. 5, a block diagram depicts one possible DSP 34 according to the present invention. The DSP 34 includes a first set of digital trackers 65a ... 65n (collectively "65") located within a standard spectrum tracking unit 64 and a second set of digital trackers 68, 70 located within a split spectrum tracking unit 66. Digital trackers 65 track standard spectrum GPS source signals, whereas digital trackers 68, 70 track a single split spectrum source. Each of the digital trackers 65, 68 and 70 receives the sampling clock signal 32 and sampled signals $I_{IF}$, $Q_{IF}$ and is controlled by microprocessor 40 through control lines 38. It will be understood that the split spectrum tracking unit 66 need not be limited to a single pair of digital trackers 68, 70. Rather, additional pairs of trackers can be used to track multiple split spectrum signals, as desired. The operation of digital trackers 65 for standard spectrum signal tracking is known in the art, see for example, aforementioned U.S. Pat. No. 5,541,606.

Figure 6:
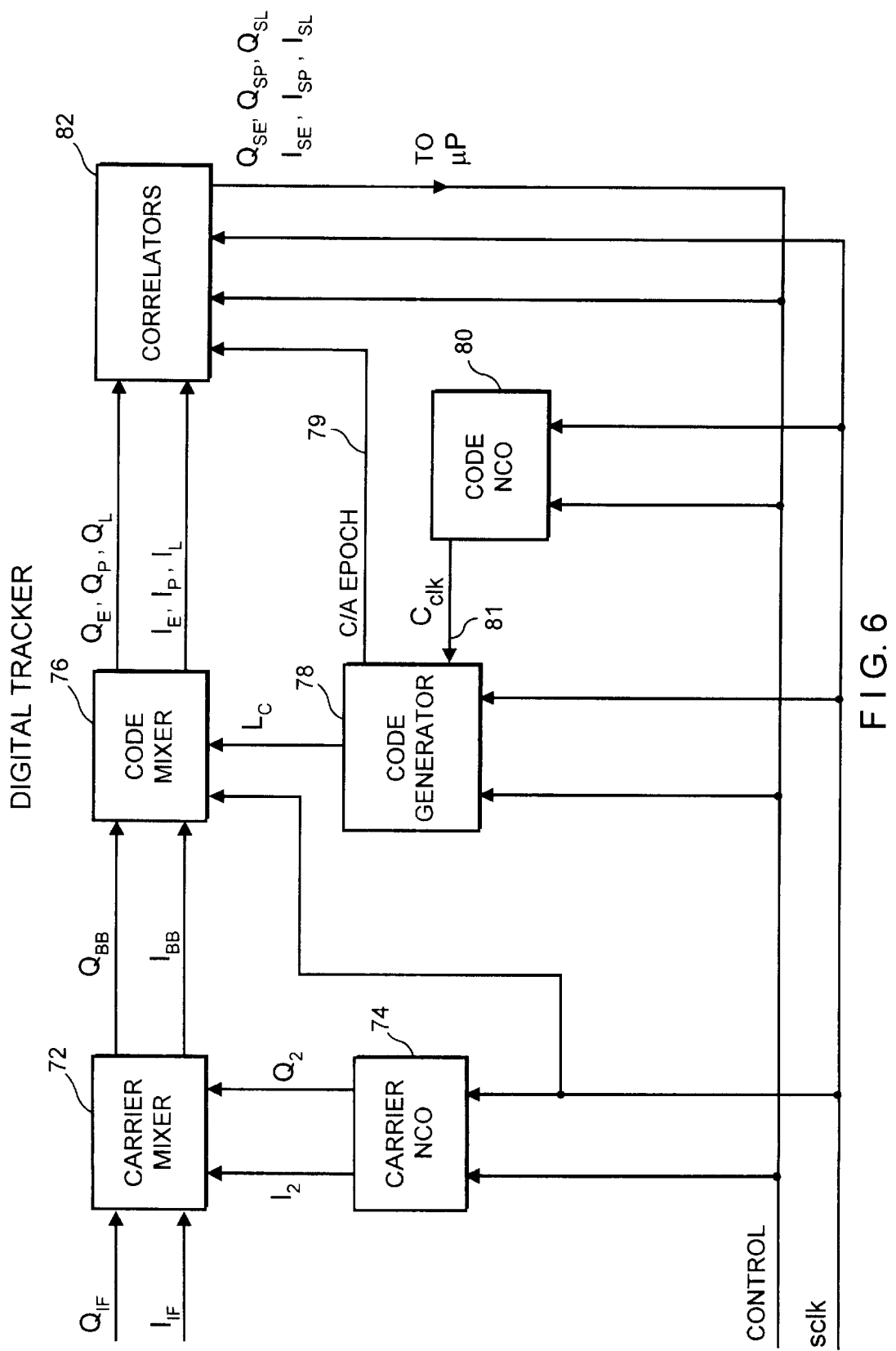
FIG. 6 is a block diagram illustrating a digital tracker according to one embodiment of the invention.

Referring to FIG. 6, there is shown a block diagram of one possible digital tracker of which the sets of trackers 65, 68, 70 may be comprised. The sampled signals $I_{IF}$, $Q_{IF}$ applied to each digital tracker contain a composite of all signals present in the RF bandwidth, for example, from all split spectrum signal sources and all standard spectrum signal sources being received. A signal derived from a particular GPS source is selected for demodulation by a digital tracker according to the carrier frequency and ranging code (C/A or P code) of the desired signal.

A combination of a carrier numerically controlled oscillator ("NCO") 74 and a carrier mixer 72 frequency translates the desired signal to baseband ("BB") signals $I_{BB}$, $Q_{BB}$, each having a frequency of about 0 hertz. The baseband signals $I_{BB}$, $Q_{BB}$ are then processed in the code mixer 76 which performs a sample by sample correlation between the ranging code contained in the baseband signals and a local version $L_c$ of a ranging code corresponding to a desired GPS source. The local version $L_c$ is generated by a code generator 78. The code generator 78 receives a clock signal 81 from a code NCO 80 and outputs a C/A code epoch start signal 79 to a correlator 82. Each of the mixed signals $I_E$, $I_P$, $I_L$, $Q_E$, $Q_P$, $Q_L$ from the code mixer 76 are accumulated in the correlator 82 for a period of time that is usually an integer multiple of the C/A code epoch periods as timed from the epoch start signal 79 before being read by the microprocessor 40. The correlator 82 outputs correlation total signals $I_{SE}$, $I_{SP}$, $I_{SL}$, $Q_{SE}$, $Q_{SP}$, $Q_{SL}$ to the microprocessor 40 which are used by the microprocessor 40 to form code and carrier tracking loops and to perform other functions. A "tracking loop" refers to the operation well known in the art wherein feedback is used to continually modify a local signal to reduce any difference between an input signal and the local signal to zero.

As previously stated, two digital trackers 68, 70 are assigned to each split spectrum signal. Thus, the digital tracker 68, for example, can be assigned to track the lower frequency sinc squared peak of the split spectrum signal, while digital tracker 70 can be assigned to track the upper frequency sinc squared peak of the split spectrum signal. As shown in FIGS. 2c and 2d, if the separation frequency is 10.23 megahertz, the lower peak of the received split spectrum signal is centered on 1565.19 megahertz (1575.42−10.23 megahertz) whereas the upper peak is centered on 1585.65 megahertz (1575.42+10.23 megahertz). Frequency translation in the RF section 26 to an intermediate frequency of 420 kilohertz causes the resulting intermediate frequency carriers of the upper and lower peaks to have a different separation. This change occurs because the starting effective carrier frequency for each peak is different. In particular, the lower peak of the split spectrum signal has an IF carrier frequency of −9.81 megahertz, whereas the upper peak has an IF carrier frequency of 10.65 megahertz. Thus, both the lower and upper peak IF carrier frequencies of the split spectrum signals fall within a low pass IF bandwidth of +/−12.5 megahertz. As a result of these IF carrier frequencies, one digital tracker 68 is set up to operate at a nominal carrier frequency of −9.81 megahertz and the other digital tracker 70 is set up to operate at a nominal carrier frequency of 10.65 megahertz. These frequencies are nominal because in practice the frequencies are adjusted while tracking to account for Doppler and receiver clock frequency offset effects.

The carrier NCO 74 of each digital tracker 65, 68, 70 is controlled by the microprocessor 40 so as to cause the $I_{BB}$, $Q_{BB}$ signals output from the carrier mixer 72 to have a frequency of about 0 hertz. Thus, the lower and upper peaks of a split spectrum signal that contain the same ranging code can be distinguished and are available to be independently tracked without mutual interference. Mutual interference is avoided because each carrier NCO 74 and carrier mixer 72 of the split spectrum digital trackers 68, 70 is operating at a different intermediate frequency thereby providing distinction between the lower and upper peaks of the split spectrum signals.

Figure 7:
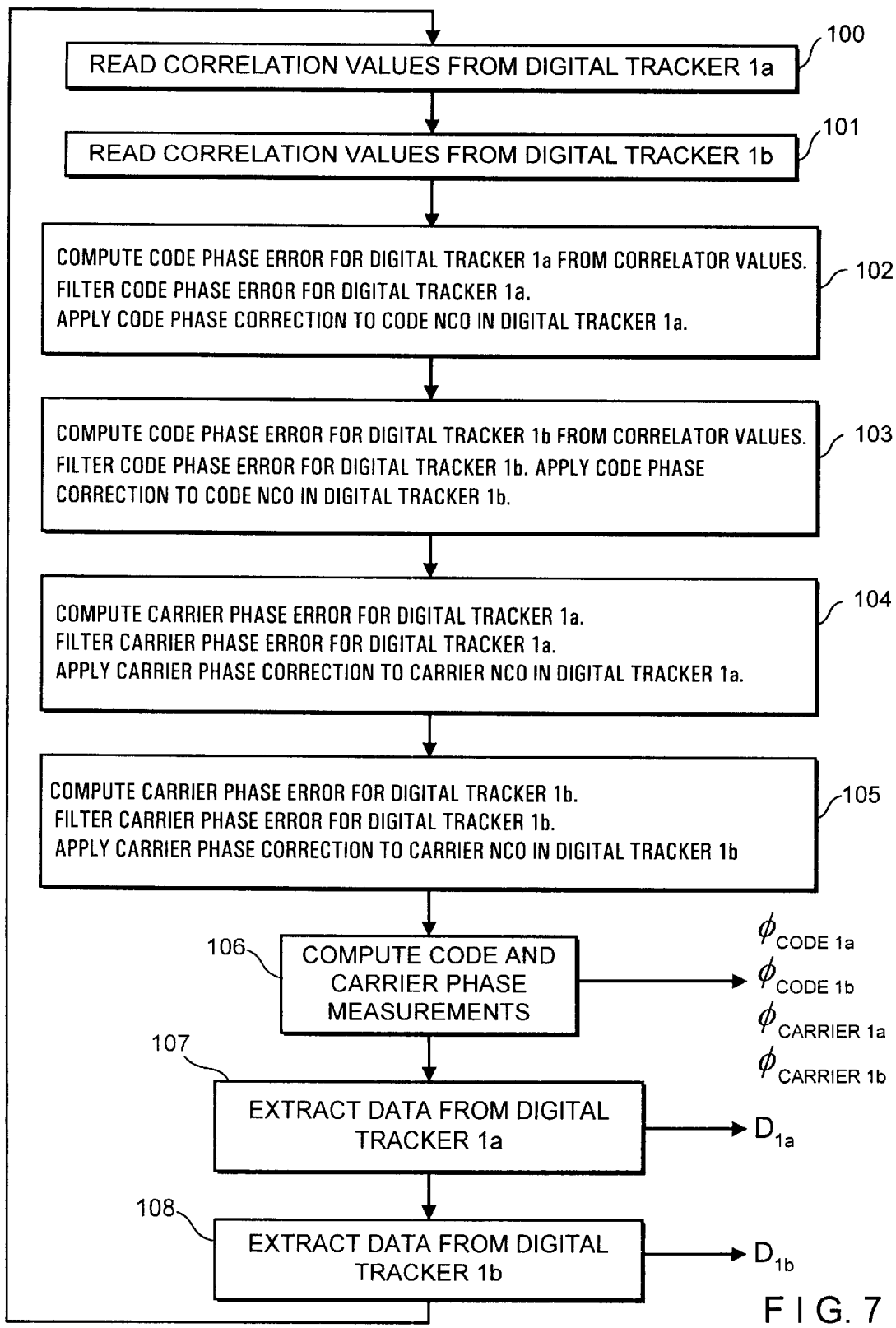
FIG. 7 is a flowchart illustrating a procedure for independent split spectrum tracking according to one embodiment of the invention.

Referring now to FIGS. 7 and 8, flowcharts are depicted for independent split spectrum tracking and for dependent split spectrum tracking, respectively. Independent split spectrum tracking as depicted in the flowchart of FIG. 7 completely separates tracking functions for the lower and upper split spectrum peaks of a split spectrum signal. For example, the code and carrier tracking loops for the lower split spectrum peak may be formed using only the correlation signals generated by the digital tracker 68. Similarly, the code and carrier tracking loops for the upper split spectrum peak may be formed using only the correlation signals generated in the digital tracker 70. Such independent split spectrum tracking results in independent code phase measurements ($f_{code\ 1a}$, $f_{code\ 1b}$) and carrier phase measurements ($f_{carrier\ 1a}$, $f_{carrier\ 1b}$) for each of the upper and lower split spectrum peaks.

In steps 100 and 101 (FIG. 7) the microprocessor 40 reads correlation totals $I_{SE}$, $I_{SP}$, $I_{SL}$, $Q_{SE}$, $Q_{SP}$, $Q_{SL}$ which are the outputs from the digital trackers 68, 70. These correlation totals $I_{SE}$, $I_{SP}$, $I_{SL}$, $Q_{SE}$, $Q_{SP}$, $Q_{SL}$ are used to compute code phase errors for each of the digital trackers 68, 70. In addition, the computed code phase errors of the digital trackers 68, 70 are then filtered. The filtered code phase errors are applied as code phase corrections to the code NCO 80 of each of the digital trackers 68, 70, steps 102 and 103. Similarly, these correlation totals $I_{SE}$, $I_{SP}$, $I_{SL}$, $Q_{SE}$, $Q_{SP}$, $Q_{SL}$ are also used to compute carrier phase errors for each of the digital trackers 68, 70. The computed carrier phase errors of the digital trackers 68, 70 are filtered and the filtered carrier phase errors are applied as carrier phase corrections to the carrier NCO 74 of each of the digital trackers 68, 70, steps 104 and 105. Once the above errors are computed and corresponding corrections are applied, code phase measurements ($f_{code\ 1a}$, $f_{code\ 1b}$) and carrier phase measurements ($f_{carrier\ 1a}$, $f_{carrier\ 1b}$) are computed and output, step 106. Lastly, data $D_{1a}$, $D_{1b}$ including ephemeris data is extracted from digital trackers 68, 70, respectively, and then output, steps 107 and 108. After step 108 is completed, the process returns to step 100 and the above sequence of steps is repeated for the next set of correlation totals $I_{SE}$, $I_{SP}$, $I_{SL}$, $Q_{SE}$, $Q_{SP}$, $Q_{SL}$.

It will be understood that independent split spectrum tracking may lose about 3 decibels of the tracking signal-to-noise ratio because the power from both of the peaks is not used in a single carrier tracking loop. The split spectrum signal essentially contains half of its power in the lower split spectrum peak and half of its power in the upper split spectrum peak. Such a loss is particularly significant for the tracking ability which is dependent on the carrier tracking loop because the carrier tracking loop is the widest bandwidth loop in a GPS receiver.

On the other hand, advantages may be had by performing dependent split spectrum tracking in which single code and carrier phase measurements for a split spectrum signal are generated. Single measurements ($f_{code\ 1a,\ 1b}$, $f_{carrier\ 1a,\ 1b}$) can be generated by calculating the average of the two code phase measurements ($f_{code\ 1a}$, $f_{code\ 1b}$) and calculating the average of the two carrier phase measurements ($f_{carrier\ 1a}$, $f_{carrier\ 1b}$). By averaging such phase measurements, the code and carrier phase measurement signal-to-noise ratio may be improved by about 3 decibels. Of course, phase measurements must be described in common units, for example meters, before being combined and averaged.

Furthermore, it will be understood that for split spectrum tracking, two GPS data information signals $D_{1a}$, $D_{1b}$ exist, one data signal for lower peak tracking and one data signal for upper peak tracking. In dependent split spectrum tracking these data signals $D_{1a}$, $D_{1b}$ can also be combined by averaging to provide a single estimate of the data bit. Such a combination has also been found to improve the signal-to-noise ratio for data bit estimation by about 3 decibels relative to using only one of the data signals. However, whether in the course of dependant split spectrum tracking one averages the databits $D_{1a}$, $D_{1b}$, the code phase measurements ($f_{code\ 1a}$, $f_{code\ 1b}$), or the carrier phase measurements ($f_{carrier\ 1a}$, $f_{carrier\ 1b}$) or each of these, the yield has been found to remain at about a 3 decibel gain in signal-to-noise ratio.

With reference to FIG. 8, steps 120–121 and 124–126 correspond to steps 100–101 and 106–108 in FIG. 7. In step 122, however, the correlation values $I_{SE}$, $I_{SP}$, $I_{SL}$, $Q_{SE}$, $Q_{SP}$, $Q_{SL}$ which are the outputs from the digital trackers 68, 70 are used to compute a single combined code phase error. Moreover, the combined code phase error is then filtered. The filtered single code phase error is applied as a code phase correction to the code NCO 80 of each of the digital trackers 68, 70 as the code tracking feedback loop. Similarly, these correlation totals are also used to compute a single combined carrier phase error, step 123. The combined carrier phase error is filtered and two carrier phase corrections are generated. Each carrier phase correction adapted to the different frequency of the respective digital tracker 68, 70. The carrier phase corrections are applied to the carrier NCO 74 of the respective digital tracker 68, 70 as part of the respective carrier tracking feedback loop. Thus, dependent split spectrum tracking uses the power from both the upper split spectrum peak and the lower split spectrum peak in its carrier and code tracking loops.

While the correlation totals $I_{SE}$, $I_{SP}$, $I_{SL}$, $Q_{SE}$, $Q_{SP}$, $Q_{SL}$ are depicted in the embodiment of FIG. 8 as combined to generate single phase errors, it will be understood that independent phase errors can be generated for each split spectrum peak and then averaged to generate a single combined phase error estimate. Using either technique, a resulting code phase correction is applied to both of the code NCO's 80 of the digital trackers 68, 70 to complete the code tracking feedback loops. In addition, the computation for the carrier phase correction can be performed in a similar fashion as for the code phase correction. However, unlike the single corrected code phase applied to each of the digital trackers 68, 70, the filtered corrected carrier phase must be adopted to the current state of each carrier NCO 74 in the digital trackers 68, 70 before being applied as a frequency adjustment because, as discussed above, unlike the code frequencies the nominal carrier frequencies of the digital trackers 68, 70 are different.

It will be understood however, that combining the power from both of the peaks of a split spectrum signal may not always be desirable. One may not wish to do so, for example, in the presence of jamming. Accordingly, an embodiment which is resistant to jamming is described below with reference to FIGS. 9 and 10.

Figure 9:
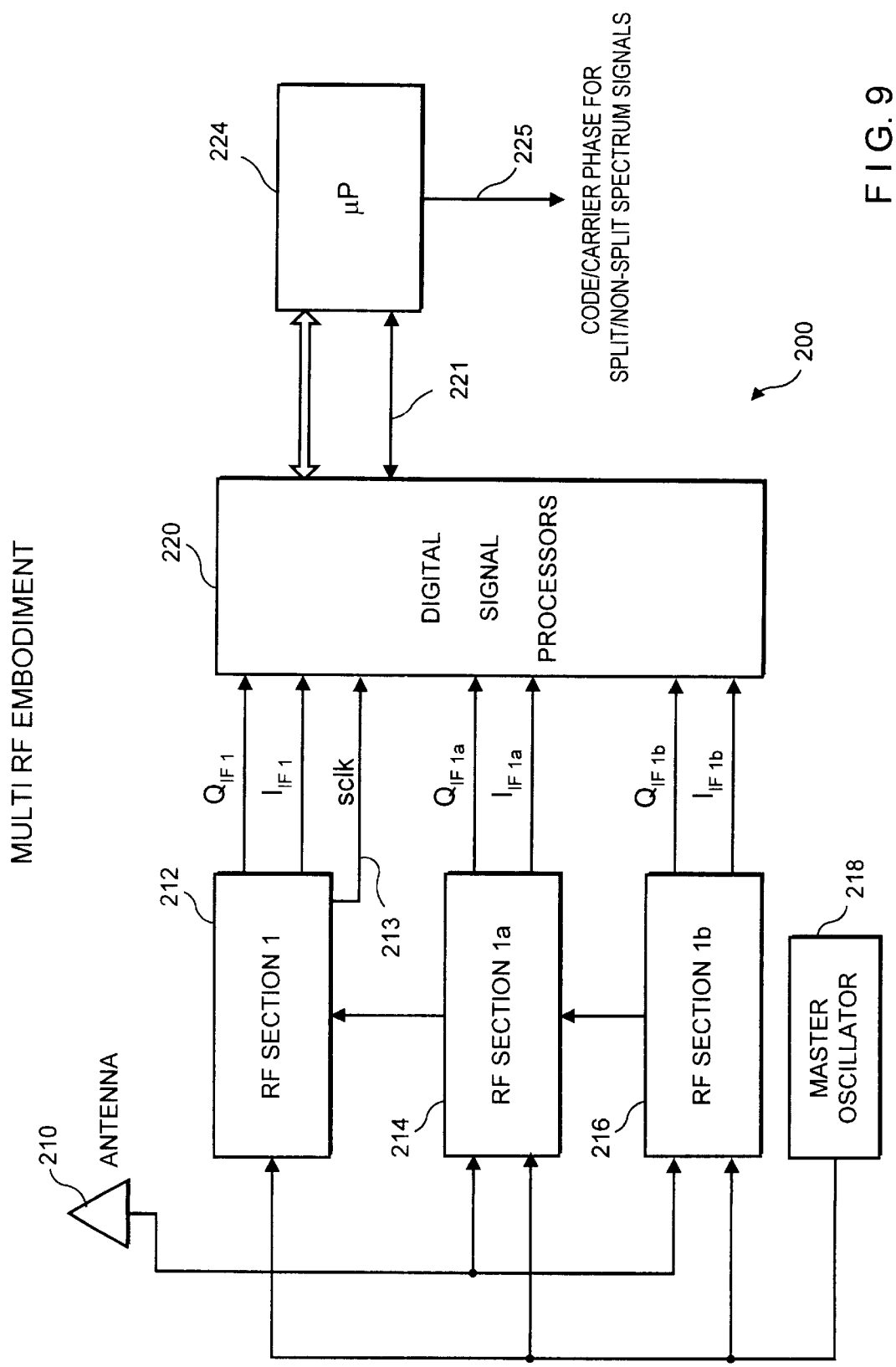
FIG. 9 is a block diagram illustrating a receiver having multiple RF sections according to one embodiment of the invention.

Referring to FIG. 9, there is shown a block diagram of a receiver 200 having multiple RF sections 212, 214, 216 according to another embodiment of the present invention. Each of the RF sections 212, 214, 216 receives the incoming composite signal comprised of split spectrum signals and standard spectrum signals detected by an antenna 210. In this embodiment, each RF section 212, 214, 216 is driven by a single master oscillator 218 and generates two respective IF signals $I_{IF}$, $Q_{IF}$. These IF signals are then output to a DSP 220. Moreover, the RF section 212 generates a sampling clock signal 213 and outputs this sampling clock signal 213 to the DSP 220. It will be understood that any of the RF sections 212, 214, 216 or other techniques can be utilized for generating this clock signal 213 and that the invention is not to be limited to the use of any RF section for generating the clock signal 213. The DSP 220 is controlled by control lines 221 from the microprocessor 224. The microprocessor 224 outputs code and carrier phase measurements 225 for split spectrum signals and standard spectrum signals.

Figure 10:
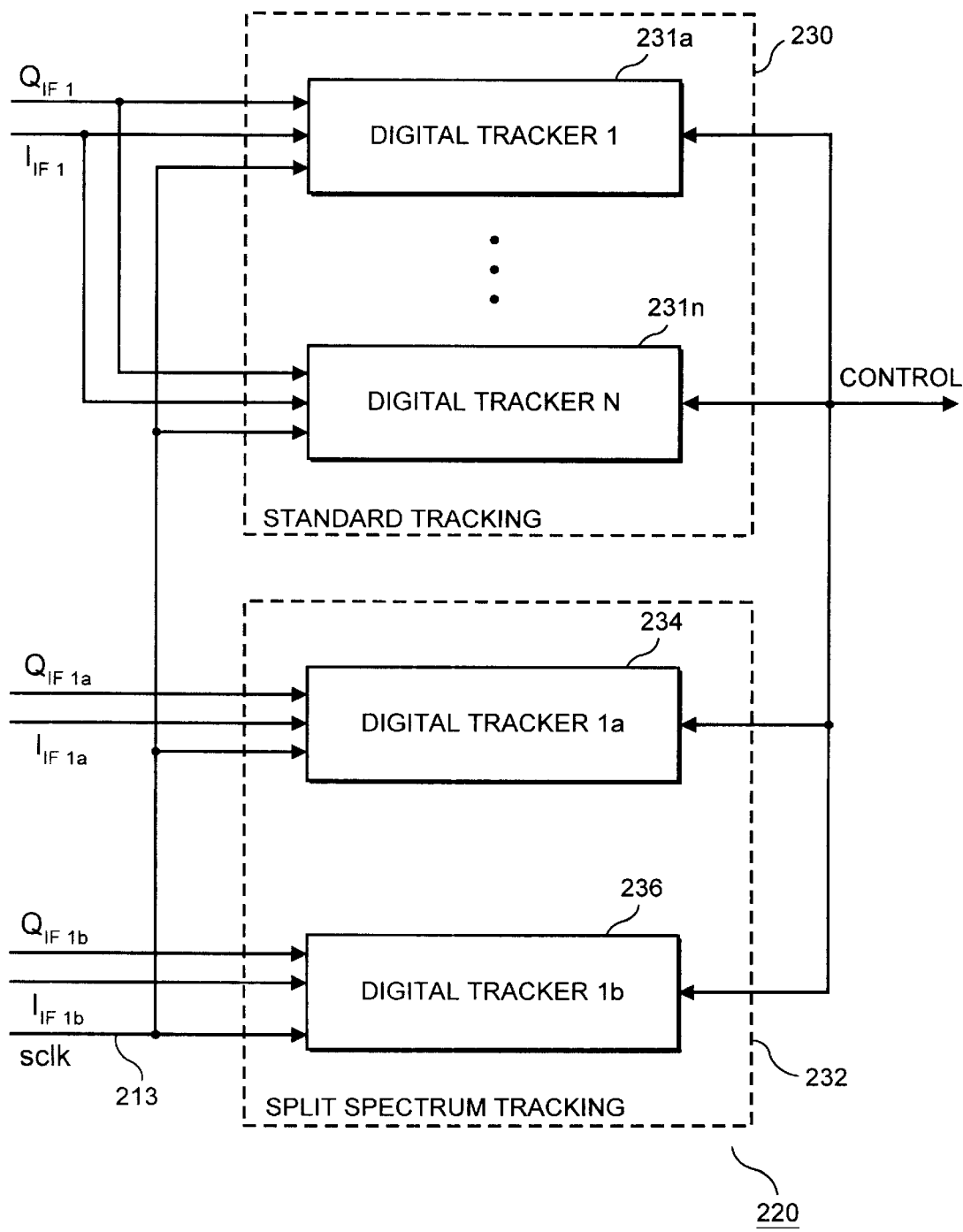
FIG. 10 is a block diagram illustrating a digital signal processor according to one embodiment of the invention.

With reference to FIG. 10, the DSP 220 may be comprised of a standard spectrum tracking section 230 having digital trackers 231a to 231n (collectively "231") and a split spectrum tracking section 232 having digital trackers 234, 236. The digital trackers 231 of the standard spectrum tracking section 230 receive the two IF signals $I_{IF1}$, $Q_{IF1}$ and the sampling clock signal 213 output from the RF section 212 to perform standard tracking of standard spectrum GPS signals. On the other hand, the digital trackers 234, 236 of the split spectrum tracking section 232 receive the respective pairs of IF signals $I_{IF1a}$, $Q_{IF1a}$, $I_{IF1b}$, $Q_{IF1b}$ output from the RF sections 214, 216 to perform split spectrum tracking of split spectrum GPS signals. The digital trackers 234, 236 also receive the sampling clock signal 213.

Each of the RF sections 212, 214, 216 (FIG. 9) is optimized to receive a particular signal component of the incoming signals. In particular, the RF section 212 may be optimized for reception of the standard spectrum signals, the RF section 214 for reception of the lower split spectrum peak of split spectrum signals, and the RF section 216 for the upper split spectrum peak of split spectrum signals. Each of the RF sections 212, 214, 216 is similar to the RF section 26 explained with reference to FIG. 4. In order to optimize each of the RF sections 212, 214, 216 to receive the desired signal component, the filters 46, 52, 54 must be adjusted. As an example, for the RF section 212, the filters 46, 52, 54 would be adjusted to produce a bandwidth of 2 megahertz centered at the L1 carrier frequency. The filters 46, 52, 54 of the RF sections 214, 216 would similarly be selected to observe only their corresponding peak signal power, that is, L1+10.23 megahertz and L1−10.23 megahertz.

The digital trackers of the standard spectrum tracking section 230 and the split spectrum tracking section 232 only observe signal power of the respective $I_{IF}$ and $Q_{IF}$ signals that each of the digital trackers is assigned to track. Therefore, improved signal detection occurs under jamming conditions because the digital trackers are tracking unjammed portions of the spectrum. Thus, the additional noise caused by jamming, which a digital tracker receiving the entire spectrum would otherwise receive, can be eliminated. For example, if only the upper split spectrum peak of the split spectrum signal is jammed, the lower split spectrum peak and the standard spectrum signal can still be processed without additional noise caused by the jamming.

Figure 11:
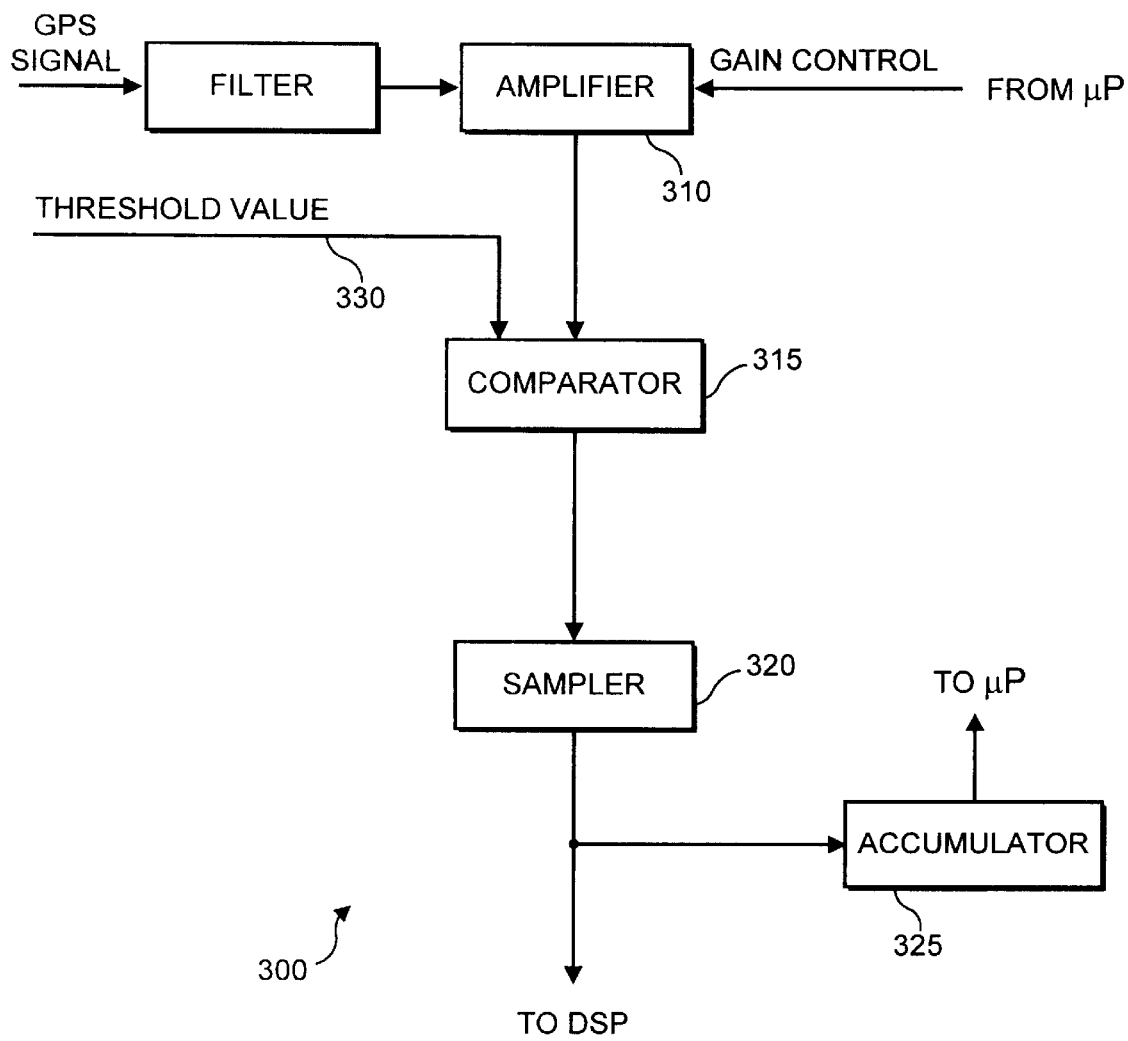
FIG. 11 is a block diagram illustrating a jamming detection circuit according to one embodiment of the invention.

Referring now to FIG. 11, there is depicted an embodiment of the present invention by which jamming may be detected through utilization of an automatic gain control ("AGC") amplifier 310 in a feedback loop 300. In this embodiment, the loop 300 consists of a comparator 315, a sampler 320, an accumulator 325, and a microprocessor. The comparator 315 compares a filtered, downconverted GPS signal, which is amplified by the AGC amplifier 310, with a threshold value 330. The result of the comparison is sampled and accumulated. The microprocessor adjusts the AGC amplifier 310 so that the accumulator output represents a predetermined percentage of the filtered, downconverted GPS signal strength, that is, the amount of time the filtered, downconverted GPS signal exceeds the threshold. When jamming commences, the accumulator output will rise to a percentage higher than the predetermined percentage since, because of the added power from the jamming, more of the filtered, downconverted GPS signal will be greater than the threshold value. As a result, the microprocessor can detect the presence of jamming.

While this invention has been described as having both standard spectrum signal and split spectrum signal capability, standard spectrum signal capability need not be included to practice the invention. Thus, for example, the digital trackers in section 230 of FIG. 10 can be omitted.

Although this invention has been described in terms of specific embodiments, this invention, including this disclosure and appended claims, is not so limited and is to be construed in accordance with the full spirit and scope of the invention including alternatives and modifications made apparent to those skilled in the art.

What is claimed is:

1. A positioning receiver comprising:

an antenna for receiving positioning signals, at least one of the positioning signals being a split spectrum positioning signal and at least one of the positioning signals being an unsplit positioning signal; the split spectrum positioning signal including energy representing positioning information split such that the energy is concentrated about at least a first frequency and a second frequency within a frequency band;

a radio frequency circuit for converting the positioning signals to intermediate frequency signals;

a digital signal processor for receiving the intermediate frequency signals and tracking at least one of the positioning signals; and a processor for controlling at least the digital signal processor;

the digital signal processor having:

a tracking unit including at least a first tracker and a second tracker for tracking the split spectrum positioning signal, each tracker receiving the intermediate frequency signals, and generating at least one correlation signal for tracking the split spectrum positioning signal; and a second tracking unit including at least one tracker for tracking the unsplit positioning signal, the tracker in the second tracking unit receiving the intermediate frequency signals and generating at least one correlation signal for tracking the unsplit positioning signal.

2. A positioning receiver as in claim 1, wherein the radio frequency circuit further comprises:

at least a first radio frequency band circuit and a second radio frequency band circuit, the first radio frequency band circuit having at least one filter selected to optimize reception of a first frequency range including the first frequency of the frequency band, and the second radio frequency band circuit having at least one filter selected to optimize reception of a second frequency range including the second frequency of the frequency band.

3. A positioning receiver as in claim 1, wherein the unsplit positioning signal is combined with the split spectrum positioning signal.

4. A positioning receiver as in claim 1, wherein each tracker further comprises:

a first mixer to convert the intermediate frequency of the signal to a near-baseband signal;

a second mixer to combine the near-baseband signal with a ranging code, the ranging code selected to match the ranging code of a positioning signal source and to generate first correlation signals; and a correlator circuit to accumulate the first correlation signals and to generate total correlation signals;

the processor receiving the total correlation signals and generating tracking signals in accordance with the correlation signals.

5. A positioning receiver as in claim 1, further comprising a jamming detection circuit, the jamming detection circuit comprising:

an amplifier for receiving a gain control signal from the processor and the intermediate frequency signals, and for generating an amplified signal;

a comparator for comparing the amplified signal to a threshold value;

an accumulator for accumulating the values of the comparator; and a gain control calculator for determining the gain control signal, and the processor for identifying when the accumulated values exceed a selected amount.

6. A navigation method comprising the steps of:

tracking an unsplit navigation signal;

tracking a split spectrum navigation signal; and obtaining navigation information from tracking information obtained from both the unsplit and the split spectrum navigation signals.

7. Navigation apparatus comprising:

means for tracking an unsplit navigation signal and producing a tracking signal based on the unsplit navigation signal;

means for tracking a split spectrum navigation signal and producing at least one tracking signal based on the split spectrum navigation signal; and means jointly responsive to said tracking signals for obtaining navigation information.

* * * * *